(12) United States Patent
Graham et al.

(10) Patent No.: US 7,134,386 B2
(45) Date of Patent: Nov. 14, 2006

(54) AUTOMATIC BOTTOM-FILLING INJECTION SYSTEM

(75) Inventors: David Wallice Graham, Carrollton, TX (US); Larry Carl Swarvar, Dallas, TX (US)

(73) Assignee: Frito-Lay North America, Inc., Plano, TX (US)

(*) Notice: Subject to any disclaimer, the term of this patent is extended or adjusted under 35 U.S.C. 154(b) by 318 days.

(21) Appl. No.: 10/694,066

(22) Filed: Oct. 27, 2003

(65) Prior Publication Data

US 2005/0087079 A1    Apr. 28, 2005

(51) Int. Cl.
*A21C 9/06* (2006.01)
(52) U.S. Cl. .................. 99/450.8; 99/494; 99/533
(58) Field of Classification Search ........ 99/450.8, 99/450.7, 450.6, 506, 532, 533, 494
See application file for complete search history.

(56) References Cited

U.S. PATENT DOCUMENTS

| | | | |
|---|---|---|---|
| 2,466,772 A * | 4/1949 | Kenyon | .................. 99/533 |
| 3,334,570 A * | 8/1967 | Nordin et al. | .................. 99/533 |
| 3,338,150 A * | 8/1967 | Nordin | .................. 99/533 |
| 3,871,274 A | 3/1975 | Hornby | |
| 4,752,488 A | 6/1988 | Hayashi et al. | |
| 4,831,923 A | 5/1989 | Elk | |
| 5,605,093 A * | 2/1997 | Higashimoto | .................. 99/533 |
| 5,738,004 A | 4/1998 | Townsend | |
| 5,900,265 A | 5/1999 | Rutherford | |
| 6,439,112 B1 | 8/2002 | Pope | |
| 6,468,572 B1 | 10/2002 | Nelson et al. | |

OTHER PUBLICATIONS

Inline Filling Systems, Inc., Advertisement for Automatic Piston Fillers, published online at http://www.fillers.com/PISTONFILLER.htm, viewed on Aug. 29, 2003.
"Injection Molding Machine Provides 10 Tons of Clamping Force," Equipment News: Molding Equipment, Medical Devicelink, published online at http://www.devicelink.com/mpmn/archive/03/01/equipnews.html, Nov. 2002.
Tom Harris, "How Krispy Kremes Work," How Stuff Works, published online at http://home.howstuffworks.com/krispy-kreme.htm/printable, 2002.

* cited by examiner

*Primary Examiner*—Reginald L. Alexander
(74) *Attorney, Agent, or Firm*—Carstens & Cahoon, LLP; Colin P. Cahoon; William S. Wang (57) ABSTRACT

A multi-port, bottom-filling injection device having a filling head that splits a flow of filling among two or more spouts or needles. In accordance with one embodiment of the present invention, an injection device comprises a filling head having several spouts attached to a spout cap, a platen for holding a chambered food item, and a holding apparatus for securing the food item during filling. The injection device can simultaneously provide a food filling to each chamber of a multi-chambered food item without leaving unsightly fill holes in the top or side surfaces.

22 Claims, 7 Drawing Sheets

AUTOMATIC BOTTOM-FILLING INJECTION SYSTEM

BACKGROUND

1. Technical Field

The present invention relates to a novel apparatus and a method for automatically injecting fillings through multiple ports into the bottom of baked or fried goods having one or more cavities.

2. Description of Related Art

For years, bakers and confectioners have added fillings into pastries and fried goods such as eclairs, cream puffs, and doughnuts. The fillings typically comprise a viscous fluid such as jam, peanut butter, cream, mousse, caramel, or pudding. Prior art apparatuses and methods for injecting fillings into hollow or chambered goods typically involve manually operated, single-port injection devices.

Some prior art devices are as simple as a handheld, flexible, non-porous bag (such as a pastry bag) that has a stiff cone or tip capable of insertion into the food to be filled. In such a device, filling is squeezed from the bag, through the cone or tip, and into the vacant chamber or chambers of the food to be filled. Other prior art devices are semi-automated but still require a human operator to manually introduce an injection needle or nozzle into the interior of the food to be filled. They also require the operator to decide when the food has been adequately filled. For example, some prior art semi-automatic filling machines require an operator to slide a hollow food product onto a filling nozzle/needle, push a filling button to initiate filling, withdraw the product from the injecting machine as the filling is injected, and stop the filling when the product appears to have adequate filling. Other semi-automatic machines can inject a predetermined amount of filling, but the operator still must manually determine when filling is complete and must manually remove the product from the machine. Removing product too soon from such devices will result in filling being placed on the exterior of the product. It is difficult to achieve consistent filling with such devices, as they depend on the judgment and skill of a human operator. The necessity of a human operator also increases operating costs, increases the opportunity for products to be damaged, and limits the maximum speed that would otherwise be available with an automated system. Furthermore, the injection nozzles/needles on such machines are limited to fairly blunt ends and large diameters in order to protect the safety of the operators. Blunt, large-diameter injection needles leave large and unsightly filling holes in the injected food items. These larger diameters also allow filling to undesirably leak out of the product.

While several prior art references disclose automated devices for filling food items, those devices are single-port injection only and cannot be efficiently used to fill food items having multiple filling sites. For example, U.S. Pat. No. 3,871,274 granted to Hornby (the "'274 patent") discloses a doughnut-filling device that uses a single needle to pierce the perimeters doughnuts and inject filling into their interiors. Similarly, U.S. Pat. No. 6,468,572 B2 granted to Nelson et al. (the "'572 patent") discloses a coring and filling device that uses a single-port injector to fill nuggets. Although the '572 patent also suggests that it may be possible to inject multiple fillings either by using one depositing device to insert a mixture of different fillings or by using a separate injection device to deposit each type of filling into a single-cavity nugget, it does not offer an efficient solution for filling multi-chambered food items with a common filling.

Prior art single-port injection devices are not efficient for filling food items having multiple cavities, complex cavities or large cavities. Filling multi-chambered items with such devices requires separate single-port injection devices for each chamber or alternatively requires that each chamber be filled one at a time. It is expensive to operate separate injection devices for each chamber, and it is unduly time-consuming to fill each chamber one at a time with a single injection device. Furthermore, it is difficult to fill large or complex cavities with viscous filling using a single-port injector because higher pumping pressure is needed to force the viscous filling throughout such cavities. The higher pressures needed to distribute filling throughout large or complex cavities can undesirably damage the texture of the filling. Higher pressures also undesirably increase the tendency for filling to seep out from the injection site. Moreover, the additional handling required by this method significantly increases the opportunity for product damage.

In addition, prior art filling devices that inject filling from above, such as a device in accordance with the '572 patent, or from the side (or perimeter), such as a device in accordance with the '274 patent, leave unsightly filling holes that remain visible when the product is viewed from above or from a side.

Consequently, a need exists for an automatic food-filling device having a multi-port filling head that is capable of filling single-chambered and multi-chambered food items from the bottom. Such a device should be able to inject a predetermined amount of filling into the chambered food item. Such a device should also be able to divide a flow of filling among multiple injection needles so that each chamber of a multi-chambered food item can be simultaneously filled with at least one needle per chamber. Alternatively, such a device should be able to quickly and efficiently fill a food item having a large or complex cavity by simultaneously injecting filling through two or more injection needles that are attached to the same filling head. Furthermore, by filling food items from the bottom, such a device should be able to fill food items without leaving unsightly injection holes that are visible from above or from the side. Automatic filling from the bottom will also reduce the occurrence of product damage due to operator handling.

SUMMARY OF THE INVENTION

In accordance with one embodiment of the present invention, a multi-port bottom-filling injection device comprises a filling head having several spouts attached to a spout cap, a platen for holding a chambered food item, and a holding apparatus for securing the food item during filling. The injection device can simultaneously provide a food filling to each chamber of a multi-chambered food item without leaving unsightly fill holes in the top or side surfaces. Such an injection device can also be used to efficiently fill large or complexly chambered food items by simultaneously introducing two or more spouts or needles into each large or complex chamber and transferring filling through those spouts or needles. A multi-port, bottom-filling injection device in accordance with the present invention can be manually operated as a single unit or automatically operated as part of an automatic filling system.

Several multi-port, bottom-filling injection devices can be incorporated into an automated filling system. Automatic injection systems in accordance with the present invention use the following filling process to fill food items: 1) a plurality of chambered food items is indexed (conveyed) downstream on a platen conveyor; 2) each food item is positioned directly over a filling head; 3) a holding apparatus is positioned about each food item during filling to secure the food item; 4) a filling head raises so that its spouts pass through the spout channels in the platen conveyor and pierce the bottom surface of the food item being filled; 5) filling is pumped into the pierced food item; 6) if desired, a small amount of filling is retracted from the spouts to prevent filling from leaking out between injection cycles; 7) the filling head retracts until its spouts are below the platen conveyor; 8) the holding apparatus is removed from the food item; and 9) the filled food item is indexed further downstream while the next chambered food item is indexed over the filling head.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 5b is an enlarged perspective view of the filling heads, platen conveyor and doughnuts shown in FIG. 5a;

DETAILED DESCRIPTION

Multi-Port, Bottom-Filling Injection Device

A multi-port, bottom-filling injection device in accordance with the present invention has a filling head that volumetrically splits a flow of filling among two or more spouts or needles. Unlike prior art food filling devices, an injection device in accordance with the present invention can simultaneously provide a food filling to each chamber of a multi-chambered food item without leaving unsightly fill holes in the top or side surfaces. Whereas prior art devices had difficulty filling food items having large or complexly-shaped chambers, an injection device in accordance with the present invention can also be used to efficiently fill such food items by simultaneously introducing two or more spouts or needles into each large or complex chamber and transferring filling through those spouts or needles. A multi-port, bottom-filling injection device in accordance with the present invention can be manually operated as a single unit or automatically operated as part of an automatic filling system.

Figure 1:
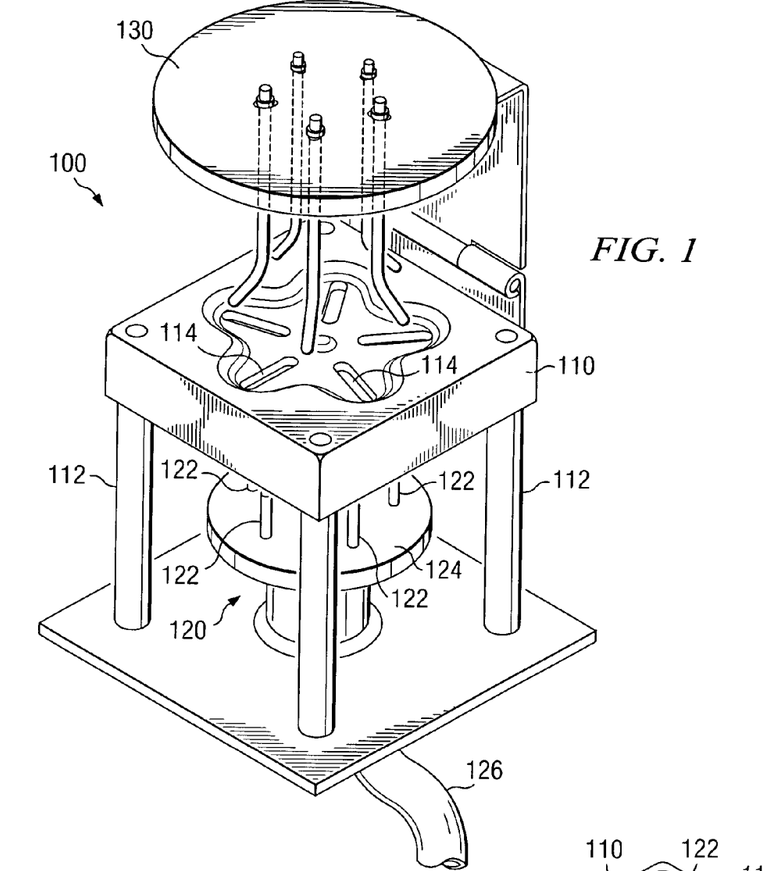
FIG. 1 is a side perspective view of one embodiment of a multi-port, bottom-filling injection device in accordance with the present invention.

FIG. 1 is a side perspective view of one embodiment of a multi-port, bottom-filling injection device 100 in accordance with the present invention. In the embodiment depicted in FIG. 1, the injection device 100 is designed to fill a star-shaped food item (such as a star-shaped doughnut with a central hole) having five main filling chambers or cavities, which may or may not be interconnected. Thus, the injection device 100 depicted in FIG. 1 comprises a platen 110 having a star-shaped depression mold for receiving a star-shaped food item, as well as a filling head 120 having five spouts 122 (or needles) for injecting filling into each of the food item's five chambers. Note, however, that while the embodiment shown in FIG. 1 shows star-shaped food items, other shapes are possible. The injection device 100 also has a holding apparatus 130 for keeping the food item firmly in place during the filling process.

Figure 2:
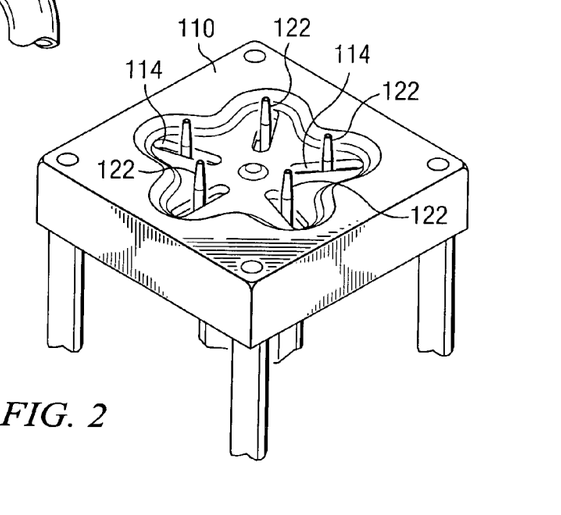
FIG. 2 is a side perspective view of the platen and spouts shown in FIG. 1.

FIG. 2 is a side perspective view of the platen 110 and spouts shown in FIG. 1. The platen 110 comprises a block, plate or tray made of a stiff, durable material such as metal, metal alloy, or hard plastic. While the platen 110 depicted in FIG. 1 and FIG. 2 is supported by several platen supports 112, the platen 110 can also be supported by other means such as a conveyor. In a large-scale automated filling system, for example, a plurality of platens can be conveyed and supported along a conveyor belt. Furthermore, the platen 110 is not limited to the box or square shape depicted in FIG. 1 and can comprise any desired shape such as an oval, rectangle, star, or any other imaginable shape. The structural properties of the platen 110 are limited only by its function, which is to support and hold food items in proper alignment with two or more filling spouts 122 (or needles). Thus, it is more desirable for the top surface of the platen 110 to have a depression mold within which a food item can be snugly seated. The depicted platen 110, for example, has a five-pointed star-shaped depression mold for receiving a star-shaped food item.

While the platen 110 only requires through-holes or spout channels 114 ("channels") of sufficient size and number through which the filling head's spouts 122 can pass, more channels 114 may be present, and each may be a larger size than necessary to accommodate various spout sizes, numbers and arrangements. For example, the platen 110 depicted in FIG. 1 and FIG. 2 has five elongate, radial channels 114 through which the embodiment's five spouts 122 can pass. The spout channels 114 of the depicted platen 110 are wider than the diameter of the needles 122 and are elongate to accommodate various spout sizes and positions.

Figure 3:
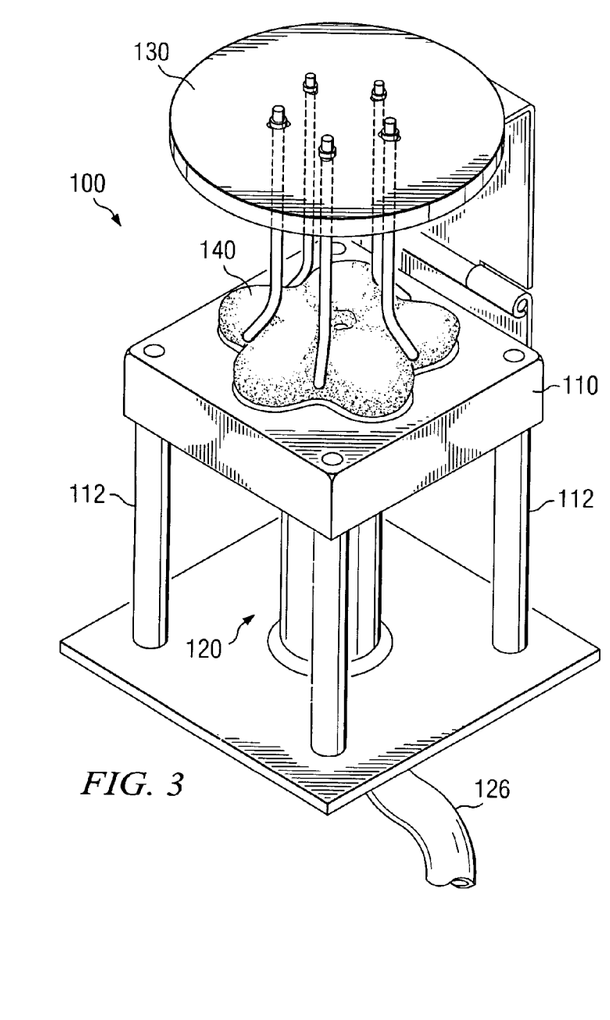
FIG. 3 is a side perspective view of a star-shaped doughnut being held in place by the holding apparatus and platen shown in FIG. 1.

FIG. 3 is a side perspective view of a star-shaped doughnut 140 being held in place by the holding apparatus 130 and platen 110 shown in FIG. 1. The holding apparatus 130 in the depicted embodiment comprises five stems that extend downwards from a header. These five stems allow the doughnut 140 to be held firmly in place while the injecting needles 122 rise through the platen 110 and into the bottom surface of the doughnut 140. The five stems are shaped and positioned so that when the holding apparatus 130 is placed in its holding position above the platen 110, the stems abut the doughnut 140 along the five valleys (or crevices) that are interposed between the five chambers of the star-shaped doughnut 140. By abutting the doughnut 140 along the five valleys where crevices and other surface imperfections might otherwise naturally form, the doughnut 140 is held in position with minimal surface damage. However, FIGS. 1 and 3 merely depict one embodiment of the holding apparatus 130. The holding apparatus 130 can comprise any structure capable of holding food items firmly in place upon the platen 110. For example, the holding apparatus 130 can simply comprise a plate that is lowered to abut the top surface of a food item in position on the platen 110. Alternatively, the holding apparatus 130 can comprise a platen 110 having a depression mold that conforms to the top surface of the food item to be filled. Furthermore, there are many acceptable methods for positioning the holding apparatus 130 over the platen 110 and the food item to be filled. Whereas the depicted holding apparatus 130 is hinged into place, other embodiments of the holding apparatus 130 are simply lowered into and raised out of position above the platen 110.

Figure 4:
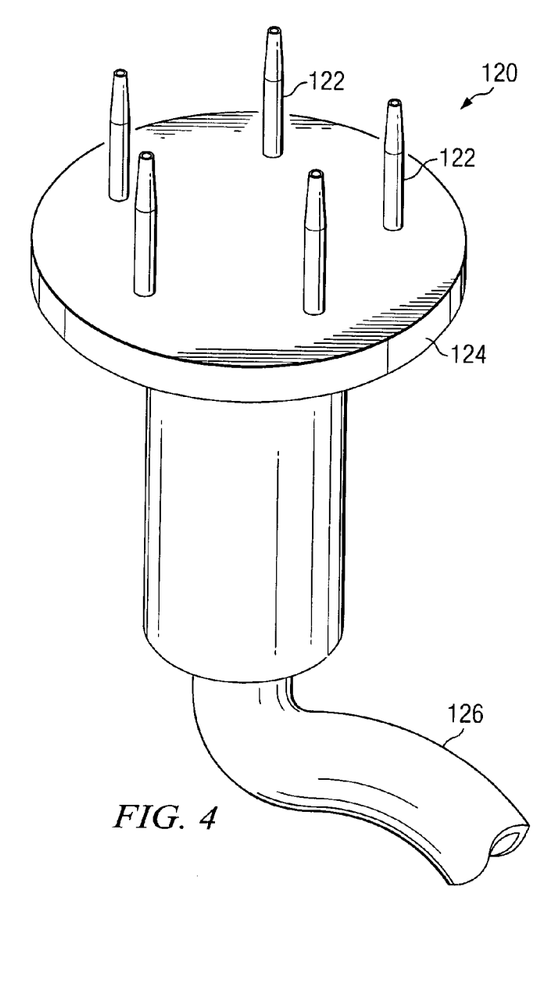
FIG. 4 is a side perspective view of the filling head from the multi-port, bottom-filling injection device depicted in FIG. 1.

FIG. 4 is a side perspective view of the filling head 120 from the multi-port, bottom-filling injection device 100 depicted in FIG. 1. The filling head 120 comprises a spout cap 124 for distributing a flow of filling among several spouts 122, two or more (i.e. a plurality of) spouts or needles 122 that are attached at their bases to the top surface of the spout cap 124, and a filling supply tube 126 that supplies the spout cap 124 with filling. In operation, the filling head 120 begins in a lowered position beneath the platen 110 and remains lowered during the placement and removal of a food item. After a chambered food item is placed upon the platen 110 and the holding apparatus 130 is lowered to secure the food item, the filling head 120 then raises so that the spouts 122 pass through the platen's channels 114 and pierce the bottom of the food item. Filling passes from the filling supply tube 126 to the spout cap 124, from the spout cap 124 to the spouts 122, and from the spouts 122 into the chambers of the food item. The filling head 120 then returns to its lowered position after the chambered food item is filled.

The spout cap 124 shown in FIGS. 1 and 4 comprises a shallow cylindrical canister that defines an inner volume through which a flow of filling can be evenly distributed to several spouts 122. Other shapes, however, are possible. For example, depending on the number of spouts 122 and their arrangement, the spout cap 124 can instead have a horizontal cross-sectional shape such as a triangle, square, rectangle, hexagon, or star. Any shape is acceptable for the spout cap 124 as long as it can distribute a flow of filling in the desired manner. For instance, a rectangular spout cap having some spouts closer to the center (or wherever the filling supply tube is attached) than others can be used to fill a food item having larger filling chambers in the middle and smaller filling chambers in the perimeter. The spout cap 124 can be made of any food-grade material strong enough to withstand operating pumping pressures. Acceptable materials include but are not limited to steel, copper, titanium, and other metals or alloys, ceramics, and hard polymers.

The spouts 122 shown in FIGS. 1 and 4 each have an elongate, cylindrical midsection and a tapered or conical injection tip. However, other types of spouts are possible. For example, the spouts 122 can instead have a conical shape, parabolic shape, or other shape. Furthermore, while the depicted spouts 122 have a circular cross-section, other cross-sectional shapes are possible, such as an oval, rectangle, cross, star, or any other imaginable shape. The type, size and shape of the spouts 122 depend on various factors including the type of filling to be added and the characteristics of the food item to be filled. For example, light and fluffy fillings such as whip cream are susceptible to shear thinning when exposed to high pressures. Thus, for such light and fluffy fillings, it is more desirable to use spouts with comparatively large diameters and large spout-tip openings in order to reduce the processing pressures necessary to transfer filling into a chambered food. It is also more desirable to use spouts that are as short as possible to reduce the amount of time that the shear-thinning-susceptible filling must spend compressed within the spouts. Such short spouts having comparatively large diameters and large spout-tip openings are also desirable for transferring very thick or viscous fillings, as well as fillings with small particulates. Viscous fillings and fillings having small particulates are less likely to plug short and wide spouts than long and narrow spouts. In contrast, it is more desirable to use narrow spouts for fillings that can handle higher pressures because narrower spouts are less intrusive, cause less damage to the bottom surface of food items, and leave smaller filling (or injection) holes. Smaller filling holes are more desirable because they are less likely to allow filling to escape from the bottom than larger filling holes, and smaller holes also may be more aesthetically appealing.

The depicted spouts 122 have spout-tip openings located at the terminal ends of each spout 122. However, the spouts 122 can alternatively have solid spout tips with the spout-tip openings located on the sides of each spout 122 near their ends.

Whereas manually operated, prior art filling devices were limited to blunt spouts (or needles) for safety reasons, a multi-port, a bottom-filling injection device 100 in accordance with the present invention is not limited to blunt spouts, regardless of whether manually operated or incorporated into an automated filling system. As explained above, the spouts 122 of an injection device 100 in accordance with the present invention can be kept in a lowered position below the platen 110 while placing and removing a food item. Thus, even if the injection device 100 were manually operated, the spouts 122 would never be exposed to a human operator. Consequently, an injection device 100 in accordance with the present invention can use very sharp spouts or needles without endangering human operators.

Like the spout cap 124, the spouts 122 (or needles) can be made of any food-grade material strong enough to withstand operating pumping pressures. The spouts 122 must also be strong enough and sharp enough to puncture the bottom surface of the food item to be filled. Acceptable materials include but are not limited to steel, copper, titanium, and other metals or alloys, ceramics, and hard polymers.

If desired, the filling head 120 can include a positive shut-off mechanism for shutting off flow to the spouts 122 when the spouts 122 are not inserted into a food item. This is particularly useful when the filling used is compressible, such whip cream. Compressible fillings sometimes continue to flow out of the open ends of the spouts 122 even after the pumping force is stopped because the filling, which compresses during the pumping phase, decompresses and expands after the pumping force is stopped. As it expands, it has nowhere to go but out the open ends of the spouts 122. This post-injection filling flow can contaminate the device components and accumulate undesirably. Thus, a positive shut-off mechanism can dramatically reduce the amount of post-injection filling flow from the spouts 122 when such mechanism is placed relatively close to the end of the filling flow path, such as at the base of each spout 122 where each spout 122 meets the spout cap 124.

In the embodiment of the filling head 120 shown in FIGS. 1 and 4, the filling head supply tube 126 connects to the center of the bottom surface of the spout cap 124. However, the filling head supply tube 126 can connect to any portion of the bottom or side surfaces depending on the shape of the spout cap 124 and the desired distribution of flow. The filling head supply tube 126 can comprise a stiff or flexible tube and can be made of any food-grade material capable of withstanding operating pressures. Acceptable materials include but are not limited to metals, alloys, ceramics, polymers, and polymer-coated fabrics.

The platen 110, filling head 120, and other components can be heated or chilled to control the viscosity and shear-thinning properties of the filling as it enters the chambered food item. When transporting a thick or viscous fluid such as peanut butter, for example, the platen 110 and/or the filling head 120 can be heated so that the fluid's viscosity decreases, thereby making the fluid less resistant to flow and easier to transport. In contrast, when injecting a fluid that is susceptible to shear thinning such as cream filling, the platen 110 and/or the filling head 120 can be chilled to help diminish the effects of shear thinning. Methods for heating and chilling equipment are well known in the art and need not be described in detail herein.

Note, however, that while the depicted embodiments are designed to fill a star-shaped doughnut, other complexly-chambered or multi-chambered food items having different shapes are possible, such as a ring-shaped doughnut having a toroidal filling chamber or a cross-shaped pastry having four filling chambers. The design of the injection device can be adjusted to accommodate differing shapes. To fill a ring-shaped doughnut having a toroidal filling chamber, for example, the platen 110 can be designed to have a ring-shaped depression mold for receiving such a doughnut. The filling head 120 can be manufactured to have several spouts 122 evenly spaced and arranged in a circle, and the holes or channels 114 can be provided in the platen 110 to accommodate those spouts 122. The holding apparatus 130 can also be adapted to secure such a ring-shaped doughnut. For example, the holding apparatus 130 can instead comprise a flat disc or a second depression-molded platen. As illustrated by the previous example, the various components of an injection device 100 in accordance with the present invention can be modified to accommodate chambered food items of many different shapes.

Manually-Operated Bottom-Filling Injection System

The multi-port, bottom-filling injection device in accordance with the present invention can be used either in a manually operated system or an automated system. In a manually operated embodiment of the device 100 shown in FIG. 1, for example, the filling head 120 begins in the lowered position with the spout tips 122 within or below the spout channels 114, and the holding apparatus 130 begins in the open position. An operator places a chambered food item onto the platen 110, making sure that the food item fits snugly within the depression mold of the platen 110, and then sets the holding apparatus 130 in the closed or holding position to prevent the food item from moving during the filling process. Next, the operator directs the filling head 120 to rise so that the spouts 122 pass through the spout channels 114, puncture the bottom surface of the food item and enter the food item's filling chambers. This can be accomplished by physically moving the filling head 120 or by employing hydraulics, motor power, or a mechanical or electrical device. For enhanced safety, the injection device 100 can be designed to prevent the filling head 120 from departing from its lowered position except when the holding apparatus 130 is in place over the platen 110. This helps prevent the operator from inadvertently contacting the spouts 122. Once the operator has raised the spouts 122 into the chambers of the food item, the operator then pumps filling through the filling supply tube 126, spout cap 124 and spouts 122 and into the chambers. While it may be desirable to pump filling into the chambers as quickly as possible, the operator should not pump the filling at such a high rate that the pre-existing air pockets within the chambers do not have time to dissipate. Pumping filling into the chambers too quickly may cause the filling to escape from the filling (injection) holes around the spouts 122. Too great a filling rate may also damage the food item or even cause the chambers of the food item to explode. Thus, the operator preferably pumps filling into the chambers at a rate that allows air within the chambers to dissipate. The operator can also pause for a few moments after pumping has stopped to allow the trapped air to continue to dissipate, as well as give the filling some time to set. Once the chambers have been filled, the operator then retracts the spouts 122 by lowering the filling head 120 to its lowered position. The operator moves the holding apparatus 130 back to its open position and then removes the filled food item.

Automatic Bottom-Filling Injection System

Figure 5A:
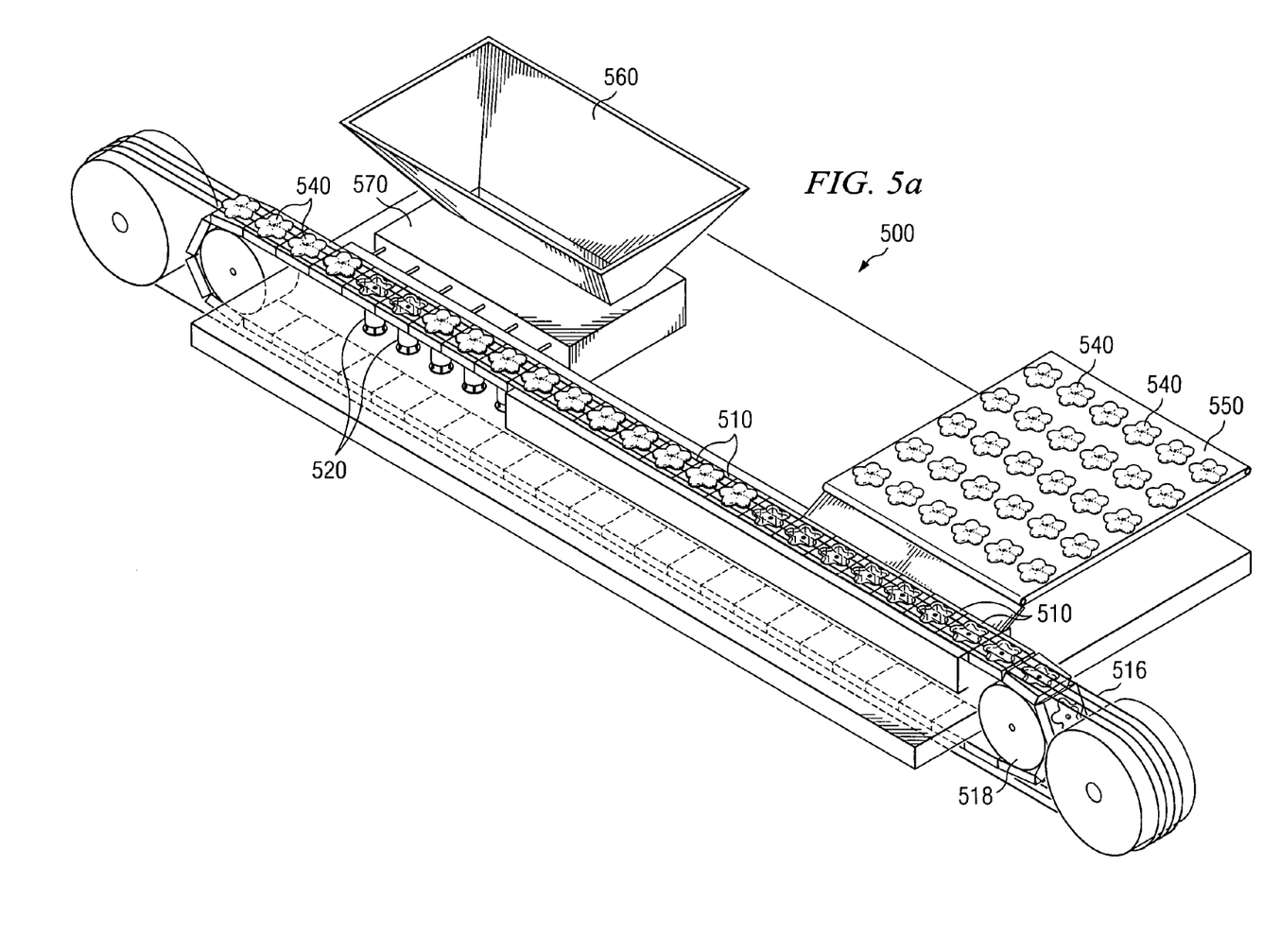
FIG. 5a is a top perspective view of one embodiment of an automatic injection system in accordance with the present invention in which chambered food items are indexed along a single-lane platen conveyor and filled six at a time using six multi-port, bottom-filling injection devices.
Figure 6:
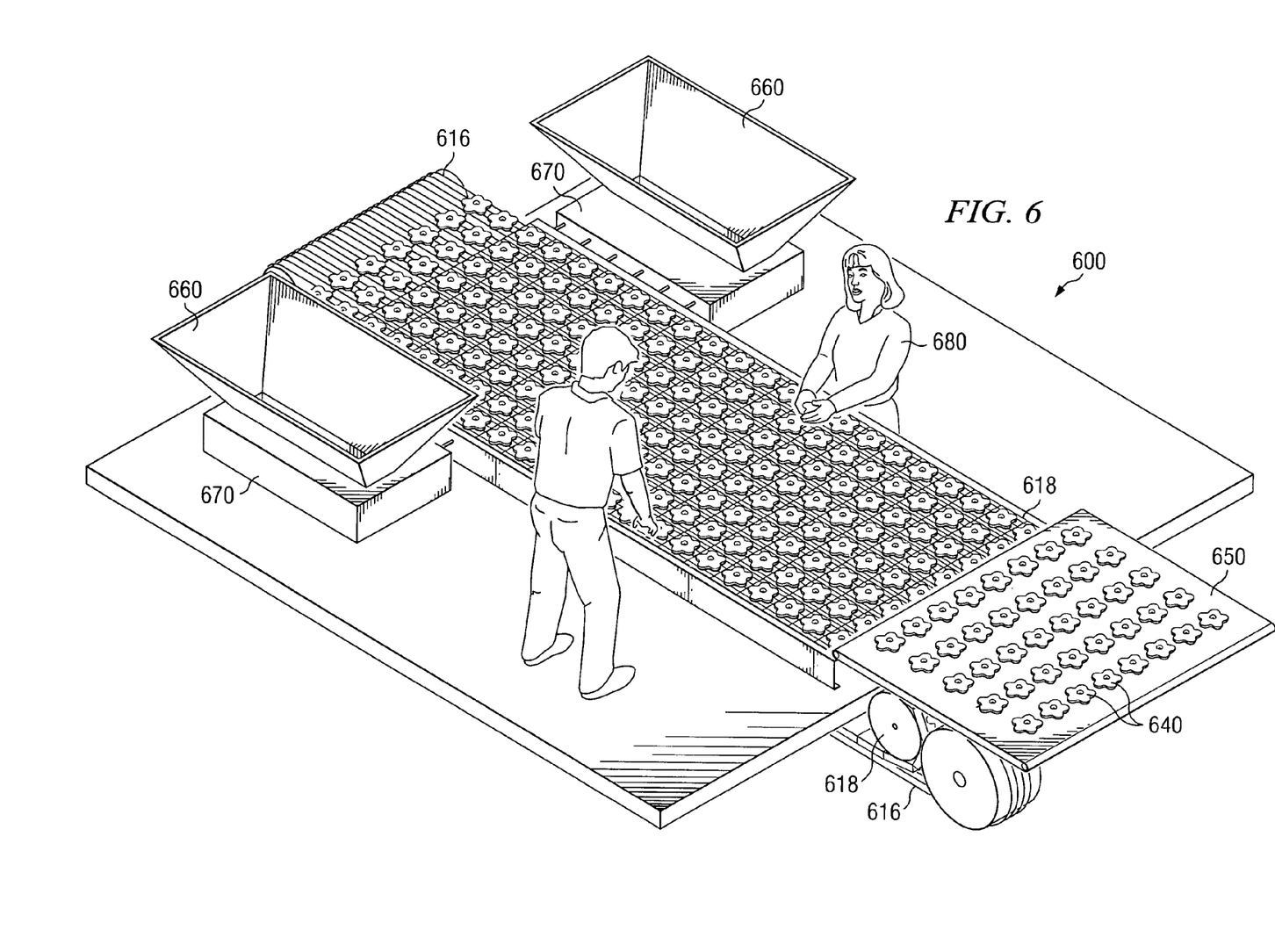
FIG. 6 is a top perspective view of another embodiment of an automatic injection system in accordance with the present invention in which chambered food items are indexed along a multi-lane platen conveyor and filled using one multi-port, bottom-filling injection device per lane to fill the food items.

In the preferred embodiment, several multi-port, bottom-filling injection devices in accordance with the present invention are incorporated into an automated filling system and are automatically operated. FIG. 5a and FIG. 6 depict two examples of an automated filling system 500, 600 incorporating several multi-port, bottom-filling injection devices in accordance with the present invention. It is important to note, however, that FIGS. 5a and 6 are merely illustrative of possible arrangements of an automatic bottom-filling injection system, and the possible embodiments are not limited to the two depicted examples 500, 600.

Automatic injection systems in accordance with the present invention, such as those depicted 500, 600 in FIGS. 5a and 6, use the same general filling process to fill food items. The general filling process comprises the following cyclical steps: 1) a plurality of chambered food items is indexed (conveyed) downstream on a platen conveyor; 2) each food item is positioned directly over a filling head; 3) a holding apparatus is positioned about each food item during filling to secure the food item; 4) a filling head raises so that its spouts pass through the spout channels in the platen conveyor and pierce the bottom surface of the food item being filled; 5) filling is pumped into the pierced food item; 6) if desired, a small amount of filling is retracted from the spouts to prevent filling from leaking out between injection cycles; 7) the filling head retracts until its spouts are below the platen conveyor; 8) the holding apparatus is removed from about the food item; and 9) the filled food item is indexed further downstream while the next chambered food item is indexed over the filling head.

FIG. 5a is a top perspective view of one embodiment of an automatic injection system 500 in accordance with the present invention in which chambered food items 540 are indexed along a single-lane platen conveyor 516 and filled six at a time using six multi-port, bottom-filling injection devices 520. Although the embodiment shown in FIG. 5a indexes and fills food items six at a time, other embodiments can index and fill any number of food items at a given time, including one at a time. For example, in embodiments having only one multi-port, bottom-filling injection device, food items can be indexed and filled one at a time.

In the embodiment shown in FIG. 5a, a plurality of star-shaped, chambered doughnuts 540 are supplied on a supply conveyor 550 and are evenly spaced into rows of six. However, as explained above with respect to FIGS. 1–4, the system components can be adapted to fill other types and shapes of chambered food items. The supply conveyor 550 deposits each row of six doughnuts 540 onto an adjacent platen conveyor 516 that runs perpendicularly to the supply conveyor 550. The doughnuts 540 are spaced within each row of six so that as they leave the supply conveyor to be deposited on the platen conveyor 518, each doughnut 540 is directly over a receiving platen 510 on the platen conveyor 518. Any method may be used to transfer the doughnuts 540 from the supply conveyor 550 to the platen molds. For example, they can be transferred with the assistance of one or more robot arms, or they may simply be transferred by hand. Such methods for transferring objects from a conveyor onto molds are well known in the art and need not be described in detail herein. Furthermore, although FIG. 5a shows organized rows of doughnuts 540 being supplied on a supply conveyor 550, the doughnuts 540 need not be organized in other embodiments. For example, in embodiments where the doughnuts 540 will be placed onto the platen conveyor 518 by hand, the doughnuts 540 need not be organized.

Figure 5B:
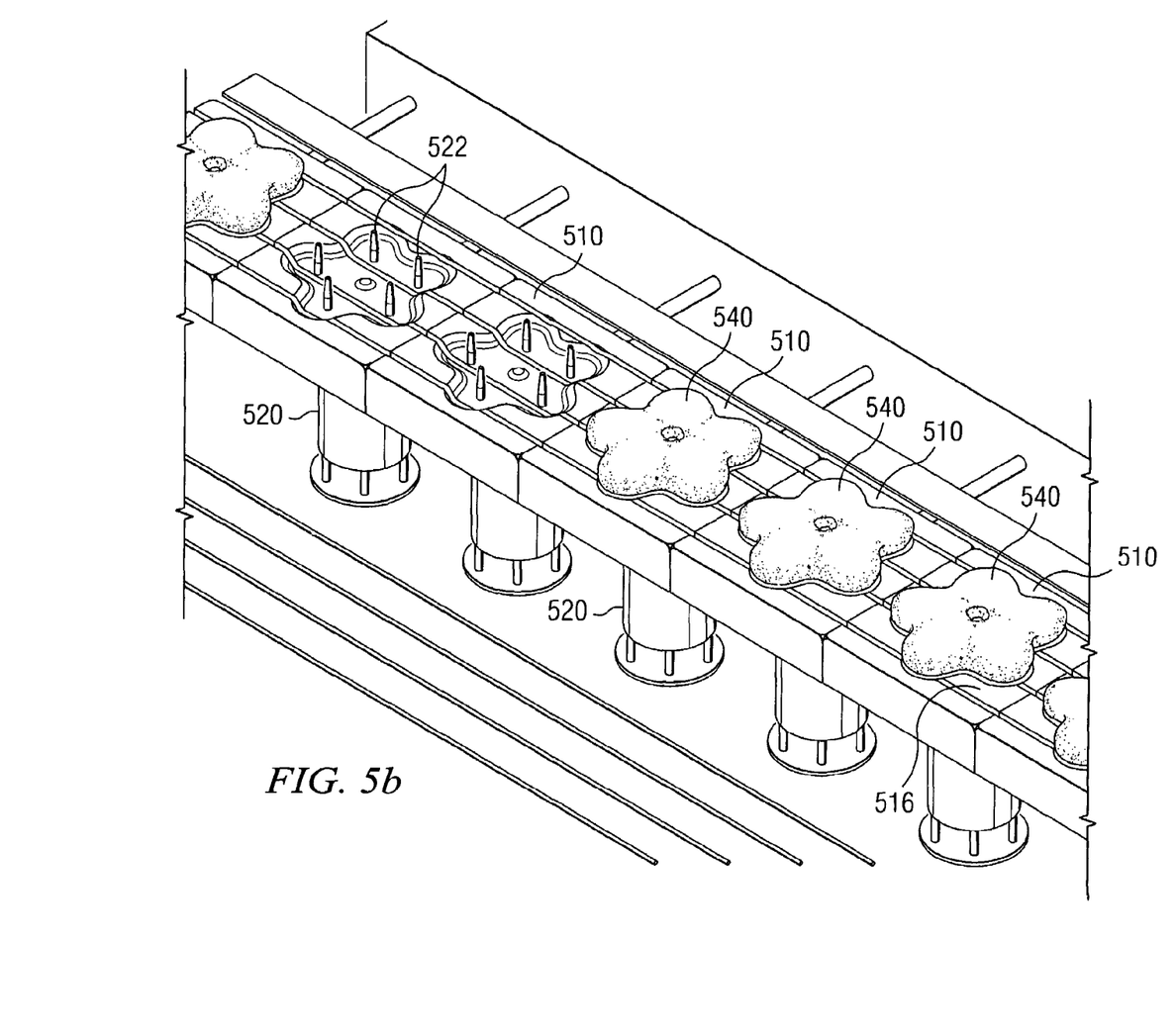
Figure 5C:
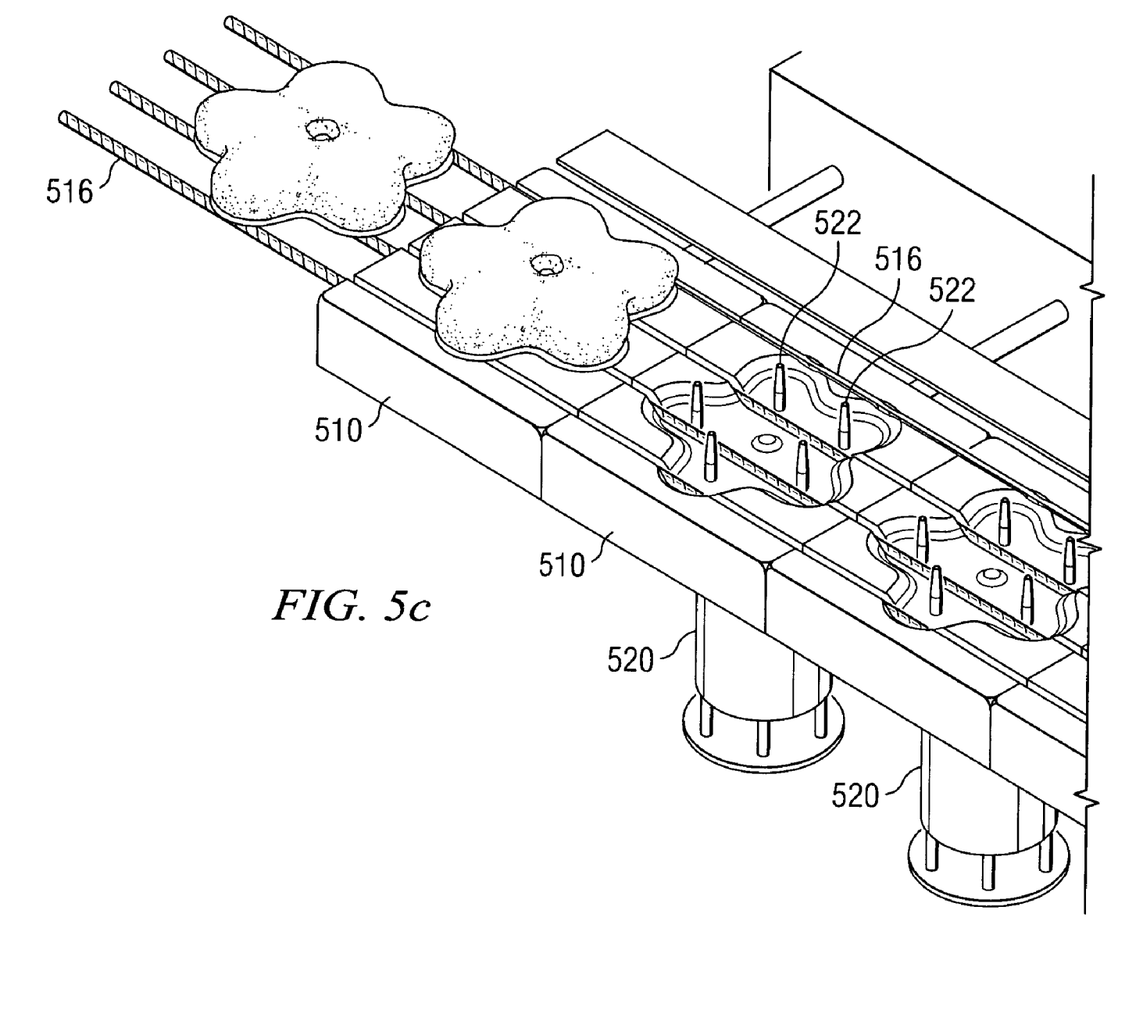
FIG. 5c is an enlarged perspective view of the rope conveyor running under the product and within grooves in the platens.

Interlaced with the platen conveyor 518 is a rope conveyor 516. Each platen 510 has rope slits along its length so that the ropes of the rope conveyor 516 can run under the doughnuts 540 while the doughnuts 540 are in place upon the platens 510. FIG. 5c is an enlarged perspective view of the rope conveyor 516 running under the product 540 and within grooves in the platens 510. The rope conveyor 516 begins from a point upstream of the platen conveyor 518, interlaces with the platen conveyor 518 throughout the platen conveyor's length, and ends downstream of the platen conveyor 518. Thus, the platen conveyor path is nested within the rope conveyor path. The rope conveyor 516 removes the doughnuts 540 from the platens 510 and supports the doughnuts 540 after the platens 510 descend and begin their return path at the platen conveyor's 518 downstream end.

The platen conveyor 518 comprises a plurality of depression-molded platens 510 that are flexibly linked to one another in series to form an endless conveyor. The properties of each platen 510 are as described above with respect to the multi-port, bottom-filling injection device 100 shown in FIGS. 1 and 2. In the embodiment shown in FIG. 5a, the platen conveyor 518 indexes food items six at a time. This means that the platen conveyor 518 moves a group of six doughnuts 540 downstream and positions them over the six injection devices 520 depicted. The platen conveyor 518 stops and waits for the six doughnuts 540 to be injected and filled. After filling, the platen conveyor 518 then moves the six filled doughnuts 540 further downstream and positions the next group of six doughnuts 540 over the injection devices 520. The intermittent movement of the platen conveyor 518 is referred to as "indexing."

Once a group of six doughnuts 540 is properly positioned over the filling heads 520, a holding apparatus (not shown) is placed down upon each of the six doughnuts 540 to prevent them from moving during the filling process. Each holding apparatus has the same characteristics as the holding apparatus described above with respect to the multi-port, bottom-filling injection device 100 shown in FIGS. 1 and 3. The holding apparatuses are then retracted after the doughnuts 540 have been filled. More specifically, the holding apparatuses can be retracted while or after the spouts retract from the doughnuts 540.

The embodiment shown in FIG. 5a has six filling heads 520 for injecting and filling indexed groups of six doughnuts 540. FIG. 5b is an enlarged perspective view of the filling heads 520, platen conveyor 518 and doughnuts 540 shown in FIG. 5a. In FIGS. 5a and 5b, two doughnuts 540 have been removed to show the spouts 522 protruding through the platens 510 on the platen conveyor 518. The filling heads 520 are spaced apart so that when the platen conveyor 518 indexes platens 510 directly over each filling head 520, each filling head's spouts 522 are vertically aligned with corresponding spout channels in the platens 510. This ensures that the spouts 522 can properly pass through the platen conveyor 518 to pierce the bottom surfaces of the doughnuts 540. The characteristics of the filling heads 520 are as described above with respect to the multi-port, bottom-filling injection device 100 shown in FIGS. 1 and 4. Like the filling head 120 shown in FIG. 4, each of the filling heads 520 shown in FIGS. 5a and 5b has several spouts 522 attached at their bases to the top of a spout cap. A filling supply tube is attached to the bottom of each spout cap.

A filling container 560 holds the filling to be injected into the food items. Although the filling container 560 shown in FIG. 5a is an open-top container having a trough shape, other types and shapes of containers are possible, such as open or closed cylindrical, rectangular, and oblong tanks. The filling container 560 should be made of a food-grade material and be strong enough to contain the desired filling.

A pumping system 570 transfers a predetermined amount of filling from the filling container 560, through the filling heads 520, and into the chambered doughnuts 540. The predetermined amount of filling depends on the volume of the food chambers to be filled. In any case, each chamber should receive no more filling than can be accommodated in that chamber. In one embodiment, the pumping system 570 does not begin to pump filling until after the spouts 522 have pierced the bottom surfaces of the doughnuts 540 to be filled. In another embodiment, however, the pumping system 570 begins to pump filling just before or as the spouts 522 pierce the bottom surfaces of the doughnuts 540. Doing so helps compensate for any time lag between the instant pumping starts and the instant filling begins to exit the spouts 522. The pumping system 570 transfers filling at a flow rate slow enough to allow the air that will be displaced by the filling to dissipate. Although not necessary, it is desirable to wait a short period of time after the pumping has ceased before retracting the spouts 522 from the doughnuts 540. This time delay gives the air that is displaced by the filling more of an opportunity to dissipate, and it also gives the filling some time to settle within the chambers of the doughnuts 540. The time delay also compensates for any time delay between the instant pumping ceases and the instant filling stops flowing out of the spouts 522.

Figure 7A:
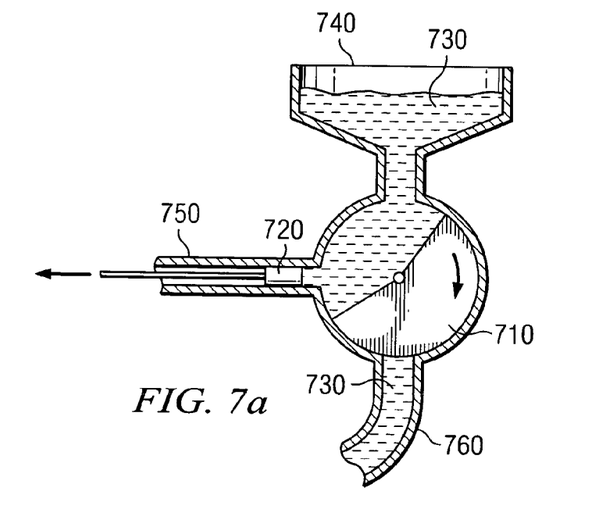
FIGS. 7a, 7b and 7c are schematic side elevational views, partially in cross-section, of an embodiment of a pumping system in accordance with the present invention.
Figure 7B:
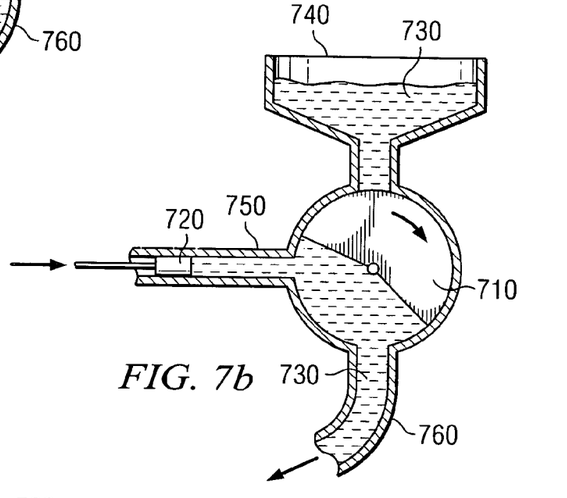
Figure 7C:
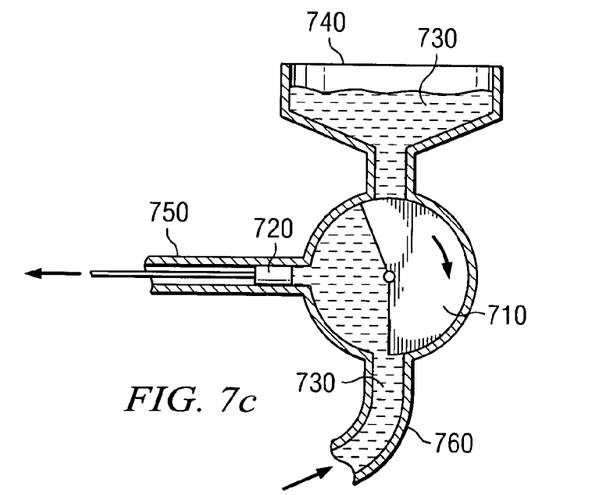

There are many possible methods for controlling when the pumping system 570 starts and stops pumping a predetermined amount of filling as described above. Many of those methods are well known in the art and need not be described in detail herein. In the preferred embodiment, however, a rotating cam within a three-port valve is used to control the timing of the following: 1) when a piston draws a predetermined volume of filling into a piston cylinder; 2) when the piston transfers the drawn filling into a filling head supply tube; and 3) when the piston draws a small amount of filling from the filling head supply tube in order to prevent filling from dripping out of the spout ends when the spouts are not injected within a food item. U.S. Pat. No. 4,752,488 (the "'488 patent") discloses a similar device and method for controlling the timing of a pumping cycle. FIG. 7a shows the position of a rotating cam 710 at the beginning of a pumping cycle as a piston 720 draws a predetermined volume of filling 730 from a filling container 740 into a piston cylinder 750. FIG. 7b shows the cam position at a later point in the pumping cycle when the piston 720 transfers the previously drawn filling 730 from the piston cylinder 750 into a filling head supply tube 760. FIG. 7c shows the cam position at the end of the pumping cycle, which also leads into the beginning of the pumping cycle. At the particular point of the pumping cycle shown in FIG. 7c, the piston 720 is just beginning to retract, and the piston 720 withdraws a small amount of filling 730 from the filling head supply tube 760. Shortly thereafter, but while the piston 720 continues to retract, the cam 710 returns to the position shown in FIG. 7a. Then the pumping cycle repeats, and the piston 720 again draws a predetermined amount of filling 730 from the filling container 740. Although the cam 710 as shown in FIGS. 7a, 7b and 7c rotates clockwise, the cam 710 can also rotate counterclockwise depending on the desired placement of the depicted components and the timing of the described actions. The rotation of the cam 710 can be linked to various actions and movements, such as the movement of the supply conveyor or another rate-controlling mechanism.

In the embodiments shown in FIGS. 5a and 6, as well as in other embodiments not shown, an optical sensor can be used to detect the lack of a food item on any platen 510, 610 in position over a filling head 520, 620. If such an optical sensor detects an empty platen 510, 610 over a particular filling head 520, 620, filling flow to the filling head 520, 620 can be cut off or diverted to prevent filling from being supplied to the filling head 520, 620 when there is no food item in place to receive the filling.

FIG. 6 is a top perspective view of another embodiment of an automatic injection system 600 in accordance with the present invention in which chambered food items 640 are indexed along a multi-lane platen conveyor 618 and filled using one multi-port, bottom-filling injection device (not shown) per lane to fill the food items 640. The embodiment shown in FIG. 6 is similar to, and contains many of the same components as, the embodiment shown in FIG. 5a. However, there are several major differences. Whereas supply conveyor 550 of the embodiment shown in FIG. 5a deposits doughnuts onto a single-lane platen conveyor 518 that runs perpendicular to the supply conveyor 550, the supply conveyor 650 of the embodiment shown in FIG. 6 deposits doughnuts 640 onto an adjacent, multi-lane platen conveyor 618 that runs in the same direction as the supply conveyor 650. As explained above with respect to the embodiment shown in FIG. 5a, the doughnuts 640 can be transferred from the supply conveyor 650 and properly seated in the molds of the platen conveyor 618 in many ways, including the use of robot arms or human workers 680. Rather than deposit, index and fill six doughnuts 540 at a time on a single-lane platen conveyor 550, the embodiment shown in FIG. 6 deposits, indexes and fills doughnuts 640 on the multi-lane platen conveyor 618 one row at a time. There is one multi-port, bottom-filling injection device (not shown) per lane for filling the doughnuts as they are indexed downstream one row at a time. The filling heads of these injection devices are preferably located near the filling containers 660 and pumping systems 670 to minimize the distance that filling must be pumped. This helps minimize the damage done to fillings that tend to deteriorate from being pumped, such as fillings susceptible to shear thinning.

Whereas prior art automated filling systems use single-port injection devices to inject filling into the tops or sides of single-chambered food items, an automatic bottom-filling injection system in accordance with the present invention uses a multi-port, bottom-filling injection system to inject filling into the bottoms of single- or multi-chambered food items. The present invention provides a device and system for efficiently filling multi-chambered or complexly chambered food items that previously could not be easily filled. Furthermore, it fills food items without leaving unsightly injection holes on the top or side surfaces.

While the invention has been particularly shown and described with reference to a preferred embodiment, it will be understood by those skilled in the art that various changes in form and detail may be made therein without departing from the spirit and scope of the invention.

We claim:

1. A multi-port, bottom-filling injection device comprising:
   a filling head having a plurality of spouts, wherein said filling head further comprises a spout cap, said spouts are inextensible and fixedly attached to the spout cap, and said spout cap distributes a flow of filling among the spouts;
   a platen having a plurality of spout channels through which the plurality of spouts can pass, wherein each one of the plurality of spouts is vertically aligned with one of the plurality of spout channels; and
   a holding apparatus disposed above the platen, wherein the holding apparatus is capable of securing a chambered food item upon the platen;
   wherein said platen has a depression mold that is complementary to the shape of said chambered food item, such that said chambered food item can be snugly seated into the depression mold.

2. The multi-port, bottom-filling injection device of claim 1 wherein each one of the plurality of spouts has an elongate, cylindrical midsection and a tapered injection tip.

3. The multi-port, bottom-filling injection device of claim 1 wherein each one of the plurality of spouts has a sharp end.

4. The multi-port, bottom-filling injection device of claim 1 wherein each one of the plurality of spouts has a spout-tip opening at its terminal end.

5. The multi-port, bottom-filling injection device of claim 1 wherein each one of the plurality of spouts has at least one spout-tip opening on its side near its terminal end.

6. The multi-port, bottom-filling injection device of claim 1 wherein the filling head further comprises a positive shut-off mechanism for shutting off a flow of filling to the plurality of spouts.

7. The multi-port, bottom-filling injection device of claim 1 wherein the depression mold of the platen has a five-pointed star shape.

8. The multi-port, bottom-filling injection device of claim 1 wherein each one of the plurality of spout channels is wider than the diameter of each one of the plurality of spouts.

9. The multi-port, bottom-filling injection device of claim 1 wherein the plurality of spout channels can accommodate several spout sizes and arrangements.

10. The multi-port, bottom-filling injection device of claim 1 wherein the holding apparatus comprises a header and a plurality of stems attached to the header.

11. A multi-port, bottom-filling injection device comprising:
- a filling head having a plurality of spouts;
- a platen having a plurality of spout channels through which the plurality of spouts can pass, wherein each one of the plurality of spouts is vertically aligned with one of the plurality of spout channels;
- a holding apparatus disposed above the platen, wherein the holding apparatus is capable of securing a chambered food item upon the platen; and
- a rope conveyor that comprises a plurality of ropes, wherein said platen further comprises a plurality of parallel grooves, and further wherein said ropes lie within said parallel grooves.

12. The multi-port, bottom-filling injection device of claim 11 wherein said filling head further comprises a spout cap, said spouts are fixedly attached to the spout cap, and said spout cap distributes a flow of filling among the spouts.

13. The multi-port, bottom-filling injection device of claim 11 wherein each one of the plurality of spouts has an elongate, cylindrical midsection and a tapered injection tip.

14. The multi-port, bottom-filling injection device of claim 11 wherein each one of the plurality of spouts has a sharp end.

15. The multi-port, bottom-filling injection device of claim 11 wherein each one of the plurality of spouts has a spout-tip opening at its terminal end.

16. The multi-port, bottom-filling injection device of claim 11 wherein each one of the plurality of spouts has at least one spout-tip opening on its side near its terminal end.

17. The multi-port, bottom-filling injection device of claim 11 wherein the filling head further comprises a positive shut-off mechanism for shutting off a flow of filling to the plurality of spouts.

18. The multi-port, bottom-filling injection device of claim 11 wherein said platen has a depression mold that is complementary to the shape of said chambered food item, such that said chambered food item can be snugly seated into the depression mold.

19. The multi-port, bottom-filling injection device of claim 11 wherein the depression mold of the platen has a five-pointed star shape.

20. The multi-port, bottom-filling injection device of claim 11 wherein each one of the plurality of spout channels is wider than the diameter of each one of the plurality of spouts.

21. The multi-port, bottom-filling injection device of claim 11 wherein the plurality of spout channels can accommodate several spout sizes and arrangements.

22. The multi-port, bottom-filling injection device of claim 11 wherein the holding apparatus comprises a header and a plurality of stems attached to the header.

* * * * *